United States Patent [19]

Knies

[11] Patent Number: 4,949,817

[45] Date of Patent: Aug. 21, 1990

[54] EMERGENCY BRAKING ARRANGEMENT FOR TRUCKS

[76] Inventor: Charles W. Knies, Rte. 3, Box 441, Huntingburg, Ind. 47542

[21] Appl. No.: 302,559

[22] Filed: Jan. 27, 1989

Related U.S. Application Data

[63] Continuation of Ser. No. 117,550, Nov. 6, 1987, abandoned.

[51] Int. Cl.$^5$ .............................................. B60T 1/14
[52] U.S. Cl. ................................................... 188/4 R
[58] Field of Search ........................ 188/4 A, 4 R, 32

[56] References Cited

U.S. PATENT DOCUMENTS

| | | | |
|---|---|---|---|
| 696,159 | 3/1902 | Best | 188/4 R |
| 1,240,150 | 9/1917 | Knisley | 188/4 R |
| 1,261,557 | 4/1918 | Kreuser | 188/4 R |
| 2,191,954 | 2/1940 | Buffa | 188/4 R |
| 2,789,665 | 4/1957 | Wright | 188/4 R |
| 2,868,333 | 1/1959 | Willison | 188/4 R |

Primary Examiner—Duane A. Reger
Attorney, Agent, or Firm—Warren D. Flackbert

[57] ABSTRACT

Am emergency braking arrangement for trucks characterized by the provision of selectively releasable brake pads typically mounted in front of the rear wheels of a truck trailer at a normal non-use condition and movable to a position beneath the truck wheels at a braking condition. The arrangement is particularly useful in controlling and/or braking the movement of a truck traveling on a downhill grade when the installed air brake system fails. The brake pads are selectively and individually controlled by the truck operator and, normally, each is restrained from unwanted movement by a plate which extends downwardly from the undersurface of the truck frame assembly. Each of the brake pads is reinforced to afford maximum durability.

3 Claims, 1 Drawing Sheet

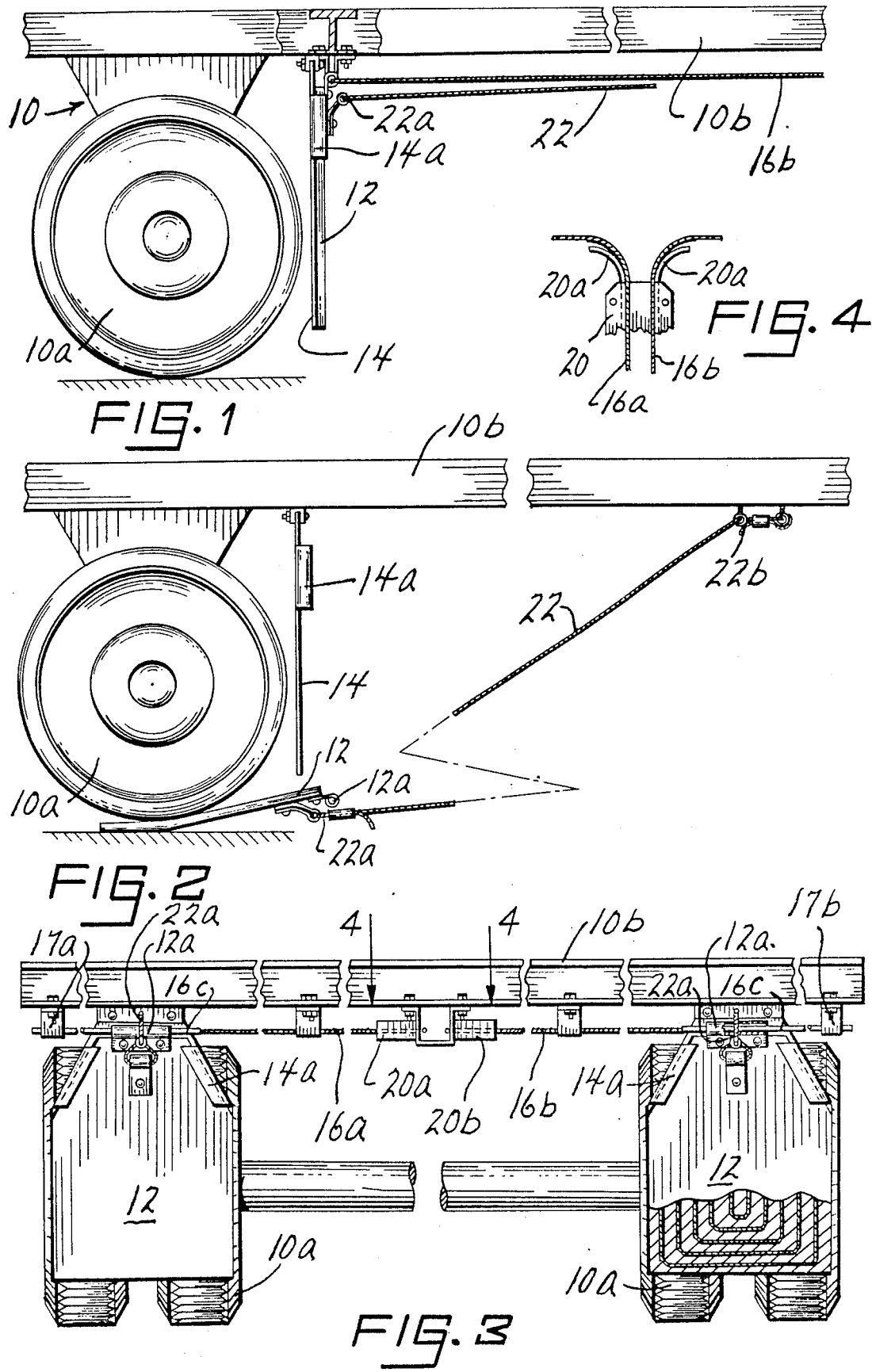

EMERGENCY BRAKING ARRANGEMENT FOR TRUCKS

This is a continuation of application Ser. No. 117,550 filed Nov. 6, 1987, now abandoned.

As is known, trucks or like vehicles oftentimes encounter braking difficulties in traveling along extended downward grades or on sharp downward grades, such as those commonly found in mountainous and/or hill areas. If the manufacturers installed air brake equipment fails, an accident, oftentimes servere in end results, could be imminent. In order to minimize the preceding, some highway systems include parallel upgrade slowdown roads which serve alternative braking purposes in effect.

The invention solves the aforesaid problem mechanically, i.e. through the selective release of braking pads for passage under the rear wheels of, for example, the truck trailer. In this connection, the aforesaid braking pads are mounted on the underframe of the trailer and, normally, in a generally vertical position. Upon release, the braking pad falls downwardly and, as stated, into a position where the wheels of the trailer pass onto such and, as a result, are limited as to free rotation, i.e. achieve a slowing/braking function.

The aforedescribed braking is typically initiated by the operator of the vehicle, where particular wheel selection is also available, i.e. to control directional vehicle veering. The invention is deemed representative of an important safety contribution to the trucking industry.

BRIEF DESCRIPTION OF THE FIGURES

In any event, a better understanding of the present invention will become more apparent from the following description, taken in conjunction with the accompanying drawing, wherein FIG. 1 is a view in side elevation, partly fragmentary and partly in vertical section, and in a normal non-operative condition, showing the emergency braking arrangement for trucks in accordance with the teachings of the present invention;

FIG. 2 is another view in elevation, comparable to that of FIG. 1, but showing the braking arrangement in an operative condition;

FIG. 3 is still another view in elevation, looking from right to left in FIG. 1, further detailing the invention; and, FIG. 4 is a top plan fragmentary view, taken at line 4—4 on FIG. 3 and looking in the direction of the arrows, even further detailing the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the emergency braking arrangement of the invention is typically used in connection with rear wheels 10a of a trailer 10 of a tractor-trailer combination. The trailer 10 includes the usual frame assembly 10b supported by the aforesaid wheels 10a (none of such structure being detailed herein).

The invention is defined by a brake pad 12 releasably mounted in front of each of the rear wheels 10a. More particularly, each brake pad 12, at a normal or inoperative condition, is typically confined within edge portions 14a of a plate member 14, the latter serving to prevent and/or confine any unwanted movement of the brake pad 12 (see FIGS. 1 and 3) before intended release (to be more fully discussed herebelow). Plate member 14 is fixedly secured onto the frame assembly 10b.

In any event, each brake pad 12 includes, at the top region thereof, a retainer member 12a which receives a pin 16c fastened to an end of control cables 16a, 16b. As evident in FIG. 3, the pin 16c and control cables 16a, 16b are supported on the vehicle frame assembly 10b by bracket members 17a and 17b, where the control cables 16a, 16b each extend around portions 20a of a guide 20 (see FIG. 4) and then towards and into the tractor cab. In other words, each control cable 16a, 16b terminates at a location (not shown) readily accessible to the operator when a driving situation so dictates.

When a use condition arises, as when the regular truck air brake system fails and the truck is freely moving and incapable of stopping, the operator actuates the control cables 16a, 16b, drawing each pin 16c from its supporting condition (in retainer member 12a) with respect to the brake pad 12. At this time, each brake pad 12 moves from the FIG. 1 to the FIG. 2 position, the latter providing a speed deterrent or braking function.

As evident in FIG. 2, another cable 22, one end 22a of which is secured to the brake pad 12 and the other end 22b to the vehicle frame assembly 10b, prevents loss of the brake pad 12, i.e. limits brake pad 12 movement with respect to the direction of truck travel.

As detailed in FIG. 3, each brake pad 12 is reinforced, and includes a pattern of, for example, steel cables 12b embedded in a flexible heavy duty plastic or elastomeric material, serving added strength against the impact force created by downward truck wheel 10a weight. In the instance where the operator finds the truck to be veering in an unwanted direction, the control cables 16a, 16b can be selectively and independently actuated to overcome the veering tendency, i.e. to maintain the truck in a proper directional course of action.

As should be evident from the preceding, the instant emergency braking arrangement, particularly adaptable for truck usage, presents an effective approach to braking when the usual truck installed braking system fails under extenuating driving circumstances. Each brake pad 12 is easily released to the operative condition (FIG. 2) by remote driver control from the cab of the tractor. Each brake pad 12, presenting sturdy physical properties, serves as a positive deterrent to run away truck movement.

The arrangement described herein is susceptible to various changes within the spirit of the invention, including, by way of example, proportioning, e.g. as to the size and shape of the brake pad; the choice of material from which the brake pad is fabricated; the particular arrangement for releasing each brake pad (and for maintaining such at a non-operative condition); the type of cable employed for brake pad control; and, the like. Thus, the preceding description should be considered illustrative and not as limiting the scope of the following claims:

I claim:

1. An emergency braking arrangement for a vehicle having a wheel mounted framework comprising a fixed flat plate extending downwardly from said framework in a generally vertical plane at a location forwardly of a wheel in the direction of movement of such, a flexible and selectively wheel engaging brake pad generally vertically disposed adjacent and forwardly of said fixed flat plate, and selective means freely and independently mounting and freely and directly dropping said flexible and selectively wheel engaging brake pad from a normal vertical hanging non-operative position in front of said fixed flat plate to an operative position beneath said wheel in a speed reducing relationship, where said mounting and dropping means includes a retainer member mounted on said flexible and selectively wheel engaging brake pad, and a control cable having a laterally disposed horizontally movable pin on one end thereof selectively supporting said retainer member and said flexible and selectively wheel engaging brake pad at said normal vertical hanging non-operative position and causing the dropping of said wheel engaging brake pad to said operational position upon slidable movement thereof, and where said fixed flat plate includes means defined by edge portions thereof confining unwanted lateral movement of edge portions of said flexible and selectively wheel engaging brake pad.

2. The emergency braking arrangement of claim 1 where release of said flexible and selectively wheel engaging brake pad is from a remote location.

3. The emergency braking arrangement of claim 1 where a control cable is provided for each independent operating rear wheel and the selective actuation of each controls vehicle veering.

* * * * *